UNITED STATES PATENT OFFICE.

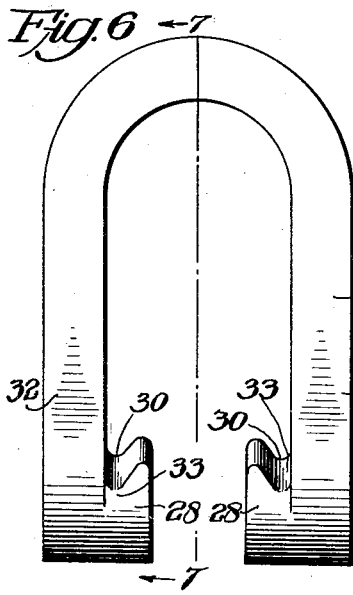
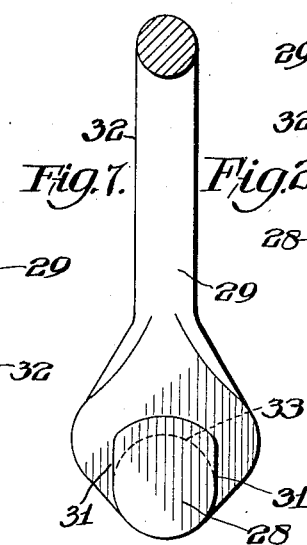
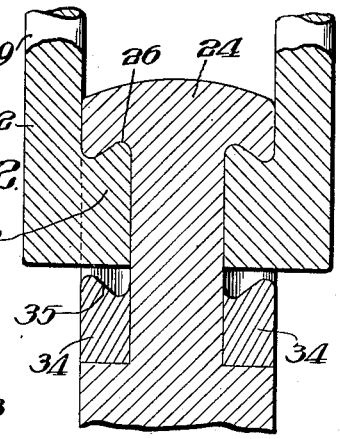
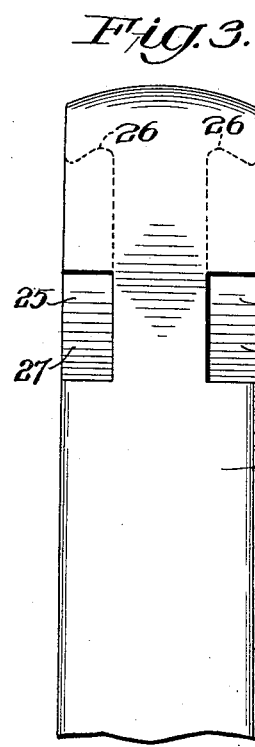
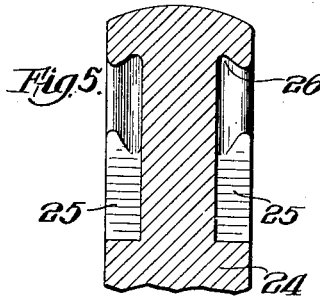
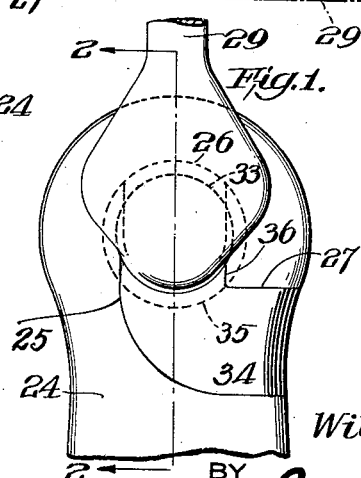
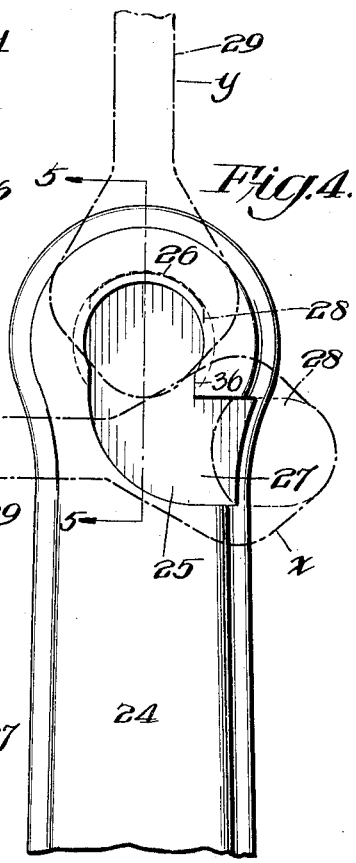

WILLIAM M. BATEMAN, OF CHESTER, PENNSYLVANIA.

ANCHOR SHANK AND SHACKLE.

1,340,002.  Specification of Letters Patent.  Patented May 11, 1920.

Application filed December 30, 1919. Serial No. 348,457.

*To all whom it may concern:*

Be it known that I, WILLIAM M. BATEMAN, a citizen of the United States, residing at Chester, in the county of Delaware and State of Pennsylvania, have invented certain new and useful Improvements in Anchor Shanks and Shackles, of which the following is a specification.

One object of my invention is to provide an improved anchor shank and shackle of the same general character as that described in my United States Patent, No. 1,321,356 of November 11, 1919, and which can be used without employing the retaining pin illustrated in my above mentioned patent.

Another object is to so construct and arrange the parts of my invention that the shank and shackle can be easily and quickly made and put together and will be freely movable to perform their functions.

A further object is to make the device of my present invention of a durable and comparatively simple construction.

These objects, and other advantageous ends which will be described hereinafter, I attain in the following manner, reference being had to the accompanying drawings in which—

Figure 1 is a fragmentary elevation showing my improved shank and shackle operatively connected together, Fig. 2 is a fragmentary section taken on the line 2—2 of Fig. 1, Fig. 3 is a side view of the anchor shank and shackle shown in Fig. 1, Fig. 4 is a face view of the anchor shank shown in Fig. 3.

Fig. 5 is a fragmentary section taken on the line 5—5 of Fig. 4,

Fig. 6 is an elevational view of the shackle shown in Fig. 1, and

Fig. 7 is a sectional view taken on the line 7—7 of Fig. 6.

Referring to the drawings, my improved anchor shank 24 has grooves 25 cut in its opposite faces; said grooves at their uppermost portions being undercut as shown at 26 and being arcuate or partly circular as shown in Fig. 4. These grooves at their bottoms have entrance openings 27 which extend substantially at right angles to the length of the shank and permit lugs or trunnions 28 of the shackle 29 to be inserted therein in the manner shown in dot-and-dash lines at *x* in Fig. 4. The trunnions 28 of the shackle 29 are undercut at their tops as shown at 30; said undercut portions being adapted to fit within the undercut portions 26 of the grooves when the shackle is in its operative position as shown in full lines in Figs. 1 and 2 and in dot-and-dash lines at *y* in Fig. 4. The sides 31 of the trunnions 28 are substantially straight as shown in Fig. 7 so that said trunnions can slip out of the entrance openings 27; it being obvious that it is not necessary to undercut the openings 27 of said grooves 25. The portions of the trunnions 28 immediately adjacent the legs 32 of the shackle are made circular, as shown at 33, so that the shank and shackle are operative to pivot relatively to each other.

To apply the shackle to the shank it is necessary to slip the entire shackle downwardly over the upper end of the shank into the position shown at *x* in Fig. 4 with the trunnions 28 in line with the entrance opening 27 of the grooves 25. The trunnions can then be moved into the entrance openings 27 of the grooves 25 and at the same time the top portions of the shackle can be swung upwardly so that the trunnions will move into the undercut portions 26 of said grooves. The entrance openings can then be closed by filling pieces 34; the top portions of said filling pieces being preferably undercut as shown at 35 in Figs. 1 and 2 so that the undercut portion 26 will be extended to form a complete circular undercut groove as provided jointly by the undercut portions 26 and 35 of the shank and filling pieces as clearly shown in Fig. 1. The filling pieces 34 can be secured to the shank either by electro-welding, spot-welding or any other suitable means.

It will be noted that, by making the sides 31 of the trunnions 28 substantially straight as above described and the plain portions of the grooves 25 of substantially the same width as the trunnions, it is impossible to remove the shackle 29 from the shank in any other manner than by first swinging it into the position shown at *x* and then pushing the trunnions out of the entrance openings 27. In other words, if the shackle is moved clockwise from the position shown at *y* in Fig. 4 and then attempted to be removed from the entrance openings 27, the sides of the trunnions 28 will jam against the shoulders 36 and thereby prevent the trunnions from being moved into the entrance openings 27. Thus even though the filling pieces 34 are omitted, the shackle can only be removed after it has been swung into a position embracing the upper end of the shank such for example as shown by the position x.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. An anchor shank and shackle in which the shank has grooves in the sides thereof, said grooves for a portion of their length extending substantially in the direction of the length of said shank and being undercut in a substantially circular path at their tops, other portions of said grooves extending at an angle toward one side of the shank to provide entrance openings, said shackle having lugs undercut at their upper portions and adapted to be slid into the upper portions of said grooves in the shank through the entrance openings; substantially as described.

2. An anchor shank and shackle in which the shank has grooves in the sides thereof, said grooves for a portion of their length extending substantially in the direction of the length of said shank and being undercut in a substantially circular path at their tops, other portions of said grooves extending at an angle toward one side of the shank to provide entrance openings, said shackle having lugs undercut at their upper portions and adapted to be slid into the upper portions of said grooves in the shank through the entrance openings, said lugs being of a width substantially equal to the width of said entrance openings and being formed substantially circular at their portions directly adjacent the legs of the shackle; substantially as described.

3. An anchor shank and shackle in which the shank has grooves in the sides thereof, said grooves for a portion of their length extending substantially in the direction of the length of said shank and being undercut in a substantially circular path at their tops, other portions of said grooves extending at an angle toward one side of the shank to provide entrance openings, said shackle having lugs undercut at their upper portions and adapted to be slid into the upper portions of said grooves in the shank through the entrance openings; and filling pieces for closing said entrance openings and having portions providing a bearing for said lugs so as to hold said lugs with their undercut portions within the undercut portions of said grooves; substantially as described.

In testimony whereof I have signed my name to this specification in the presence of two subscribing witnesses.

WILLIAM M. BATEMAN.

Witnesses:
  CHAS. E. POTTS,
  ANNA RENTON.